United States Patent
HoogerBrugge et al.

(10) Patent No.: US 7,051,136 B2
(45) Date of Patent: May 23, 2006

(54) ENTRY LOCKING FOR LARGE DATA STRUCTURES

(75) Inventors: Jan HoogerBrugge, Eindhoven (NL); Paul Stravers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 145 days.

(21) Appl. No.: 10/494,823

(22) PCT Filed: Oct. 28, 2002

(86) PCT No.: PCT/IB02/04531

§ 371 (c)(1),
(2), (4) Date: May 7, 2004

(87) PCT Pub. No.: WO03/042816

PCT Pub. Date: May 22, 2003

(65) Prior Publication Data

US 2004/0267745 A1   Dec. 30, 2004

(30) Foreign Application Priority Data

Nov. 13, 2001  (EP) ................................. 01204330

(51) Int. Cl.
*G06F 17/30*  (2006.01)
*G06F 7/00*  (2006.01)
(52) U.S. Cl. .......................................... 710/200; 707/8
(58) Field of Classification Search ............... 710/200, 710/39, 5; 707/8, 201, 100, 9; 711/163, 711/216; 718/104; 712/220
See application file for complete search history.

(56) References Cited

U.S. PATENT DOCUMENTS

| | | | | |
|---|---|---|---|---|
| 4,480,304 A * | 10/1984 | Carr et al. | ................... | 710/200 |
| 5,109,511 A * | 4/1992 | Nitta et al. | .................. | 718/104 |
| 5,339,427 A * | 8/1994 | Elko et al. | ................... | 718/103 |
| 5,737,611 A * | 4/1998 | Vicik | .......................... | 710/200 |
| 6,360,220 B1 * | 3/2002 | Forin | ............................. | 707/8 |
| 6,529,905 B1 * | 3/2003 | Bray et al. | ..................... | 707/8 |

OTHER PUBLICATIONS

"Resource management in software-programmable router operating systems" by Yan., D.K.Y., Xianging Chen (abstract only) Publication Date: Mar. 2001.*

* cited by examiner

*Primary Examiner*—Gopal C. Ray

(57) ABSTRACT

The invention is based on the idea that for a large data structure with N entries, memory space for the locks corresponding to the entries can be saved by performing a hashing function on a value that represents an entry into a hashed value 1 to M. This hashed value is used to index the table of M locks. The value of M is typically much smaller than the value of N thereby reducing memory space requirements. If M is chosen large enough and a good hashing function is selected, problems with collisions will be very small. Additionally, problems relating to deadlock occurring, when the hashed value of a second entry equals the hashed value of a first entry, are being addressed by swapping the hashed values of the first and second entries, when the hashed value of the second entry is smaller than the hashed value of the first entry.

7 Claims, 1 Drawing Sheet

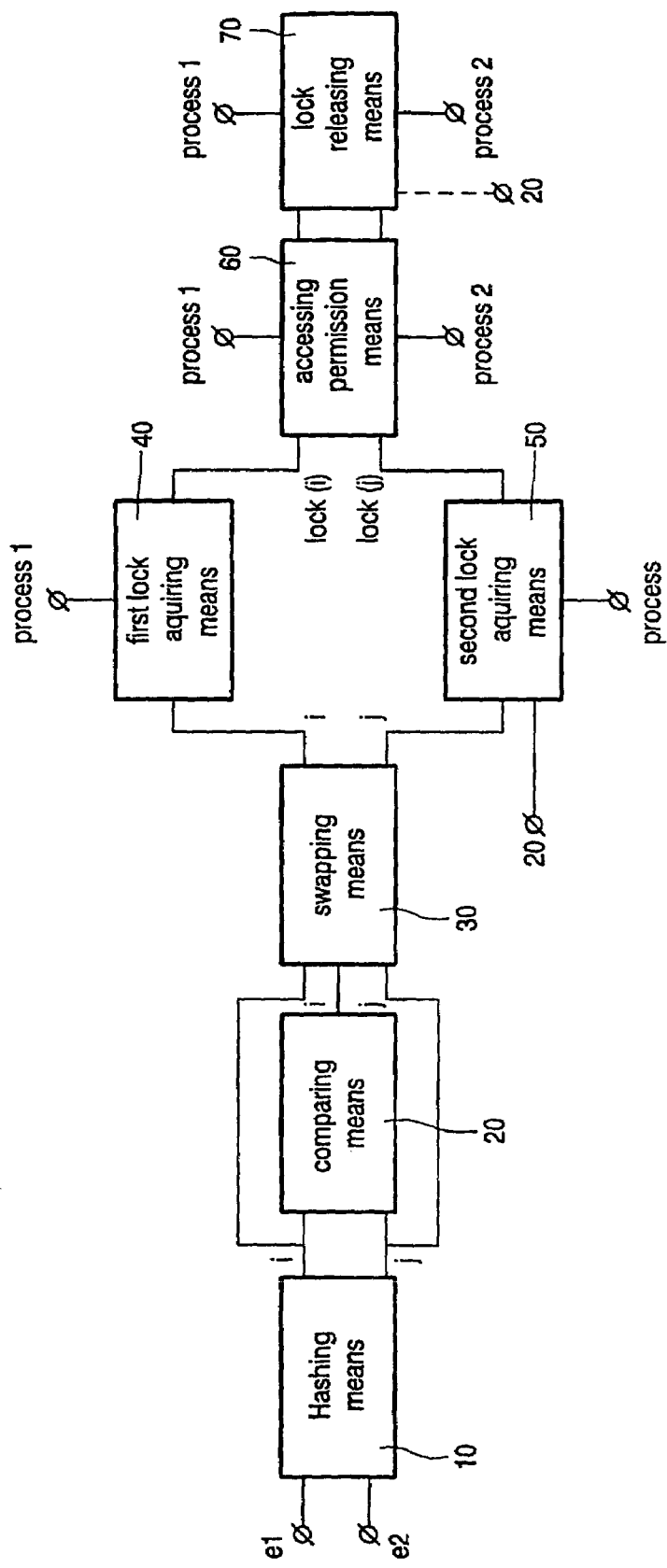

ENTRY LOCKING FOR LARGE DATA STRUCTURES

The invention relates to a method for locking entries using recursive locks, a method for locking entries using non-recursive locks as well as corresponding devices respectively, a computer system, and a computer program product.

To enhance operating efficiency, a data structure may be shared by a plurality of processes which require the same information to perform various tasks. Synchronising access to a shared data structure is a great challenge for the operation of a computer with multiple processors and is especially important whenever multiple processors attempt to update information in the data structure. Without efficient synchronisation the performance of the system including a shared data structure is severely degraded. When one processor performs an update of the data structure it is common for the entire data structure to be inaccessible or "locked" to other processors. In other words the non-updating processors must wait until the data structure is unlocked before the information contained in the structure can be accessed or updated.

Therefore, data processing systems that concurrently perform multiple processes must have means for synchronising access to common resources that are shared by the multiple processors. Typically, data processing systems have provided such synchronised access to the shared resources by employing busy-waiting strategies. In a busy-waiting each process makes a request for a resource and wait idle until the result is available. When the result eventually becomes available, an idle process gains access to the resource. This approach provides adequate synchronisation but suffers the drawback that the processor must idle while waiting for the resource.

A data structure as a data processing resource has a single memory address which includes a value field for holding values and a lock field for indicating the lock state of the value field at the memory address. When this lock field indicates that the value field is locked, no process other than the process that locked the value field may gain access to the value field. When the lock state is unlocked any process may gain access to the resource. The value field may hold the data or alternatively it may hold a pointer to a deferred list of lock or unlock requests. These two kinds of values share the use of the value field to optimise efficiency. They can share the same value field because they will never be stored in the value field at the same time. The nature of the two values makes them inherently mutually exclusive. Alternatively, the pointer does not share the value field with data but is rather stored in a separate field that is distinct from the value field.

In a large data structure with a large number of entries which need to be accessed from multiple processes, each entry in said data structure has a lock that the process has to acquire before it can use the entry exclusively. When the entry of the data structure has been used by said process, it has to release the lock again, so that other processes may access said entry. If the process has to perform some operation on a number of entries, it will usually have to acquire all the locks for performing said operation and release the locks afterwards. The acquiring of the locks has to be done in a fixed order to avoid the deadlock.

The lock may be the Boolean variable representing the state—locked or not locked—but often also contains a list of other processes that are blocked by the lock. A data structure of N entries needs N locks. The locks may be part of the data structure or may be stored in a separate data structure. A lock table is a sequence of objects, called lock table entries. The number of lock table entries is determined when the table is created. The lock table entries are numbered from 0 to the lock table entry count less one.

U.S. Pat. No. 5,339,427 is related to a lock management means for supporting a distributed locking protocol used by a plurality of sharing lock managements executed on processes having access to the shared memory. The request to lock a resource shared among the lock managers is first checked against a local hash table and then if necessary forwarded to the system lock management means SLM. Said SLM provides an interface for the locking and recovery of entries in a shared data structure. A control structure of the SLM is comprised of a hash table and control blocks chained from the hash table entries which represent the status of serialised resources. The SLM associates a lock table entry with each hash table entry. The hash table value indicates which entry in the hash table is to be used to manage serialisation of a specific resource. However, the locks are put in an open hash table by putting them in a chain. According to the hashed value it is determined or decided which chain to used.

Hashing is a well known technique for the transformation of a string of characters into a usually shorter fixed-length value or key that represents the original string. Hashing is used to index and retrieve items in a database because it is faster to find the item using the shorter hashed key than to find it using the original value. The hash function is used to index the original value or key and then used later each time the data associated with the value or key is to be retrieved. Thus, hashing is always a one-way operation. A good hash function also should not produce the same hash value from two different inputs. If it does, this is known as a collision. However, a hash function that offers an extremely low risk of collision may be considered acceptable.

It is an object of the invention to improve entry locking for large data sources accessed from multiple processes.

The object is solved by a method for locking entries using recursive locks according to claim 1; a method for locking entries using non-recursive locks according to claim 2 as well as corresponding devices according to claims 4 and 5, respectively.

The invention is based on the idea that for a large data structure with N entries, memory space for the locks corresponding to said entries can be saved by performing a hashing function on a value that represents an entry into a hashed value 1 to M. This hashed value is used to index the table of M locks. The value of M is typically much smaller than the value of N thereby reducing memory space requirements. If M is chosen large enough and a good hashing function is selected problems with collisions will be very small. Additionally, problems relating to deadlock occurring, when the hashed value of a second entry equals the hashed value of the a first entry, are being addressed by swapping said hashed values of said first and second entry, when the hashed value of the second entry is smaller than the hashed value of the first entry.

When recursive locks are being used a first process acquires are first lock corresponding to said first hashed value and a second process acquires are second lock corresponding to said second hashed value. Said first and second process are granted exclusive access to said first and second entry in said data structure after having acquired said first and second lock, respectively. Said first and second process perform the necessary processing and releases said first and second lock again thereafter, so that other processes may access said entries.

When non-recursive lock are being used, the locking of entries will be performed very similar as in the case recursive locks, but a second process will only be able to acquire the second lock corresponding to a second entry, when the first hashed value does not equal the second hashed value. Furthermore the second process will only be able to release the second lock, when the first hashed value does not equal the second hashed value.

In a preferred embodiment of the present invention, the value M is proportional to the multiplication of the number of processes which are simultaneously accessing the data structure with the number of entries that said processes averagely need to lock in order to carry out their processing.

According to the invention, a computer system according to claim 6 is also provided.

Furthermore the invention provides a computer program product according to claim 7.

The invention will now be explained in more detail with reference to the drawing, in which:

FIG. 1 shows a block diagram of the device for locking entries in the data structure.

In FIG. 1 a block diagram of a device for locking entries in the large data structure is shown. Said device comprises hashing means 10, a comparing means 20, a swapping means 30, a first lock acquiring means 40, a second lock acquiring means 50, a accessing permission means 60, and a lock releasing means 70.

Said hashing means 10 receives values that represent the entries in said data structure as input signals and outputs the hashed values of said input signals to said comparing means 20 and said swapping means 30. Said comparing means 20 outputs the comparison result of said input signals to said swapping means 30. Said swapping means 30 receives the comparison result from said comparing means 20 as well as the output signals from said hashing means 10 and outputs hashed values to said first the lock acquiring means 40 and said second lock acquiring means 50. Said first and second lock acquiring means 40, 50 are connected to said first and second processes, respectively and to said accessing permission means 60 which in turns is connected to the first and second process as well as to the lock releasing means 70. Said lock releasing means 70 is also connected to said first process and said second process.

According to the first embodiment of the present invention recursive locks are being used, which can be locked multiple times by the same process. Said hashing means 10 receives a value representing said first entry e1 and a value representing the second entry e2 as input signals. Said hashing means 10 performs the hashing function on said received values representing said first and second entry e1, e2 into a first and a second hashed value i, j, between 1 and M. Said hashed values are used to index a table of M locks. Said comparing means 20 receives said first and second hashed values i, j, compares the values thereof, and outputs a comparison result. Said swapping means 30 receives the comparison result from said comparing means 20 as well as said first and second hashed values i, j and swaps said first and second hashed values i, j, if said second value j is smaller than said first value i according to the comparison result from said comparing means 20. The swapping of said first and second hashed values is performed when said second value j is smaller than said first value i, in order to avoid deadlock when said first hashed value equals said second hashed value. Thereafter, said swapping means 30 outputs said first hashed value i to said first lock acquiring means 40 and said second hashed value j to said second lock acquiring means 50.

Said first lock acquiring means 40 enables a first process to acquire a first lock lock(i) for said first entry e1 corresponding to said first hashed value i. Said second lock acquiring means 50 enables a second process to acquire a second lock lock(j) for said second entry e2 corresponding to the second hashed value j. Said accessing permission means 60 grants an exclusive access for said first process to said first entry e1 on the basis of the acquired first lock lock(i) and an exclusive access for said second process to said second entry e2 on the basis of the acquired second lock lock(i).

When said first and second process have acquired said first and second lock(i), lock(j), said first and second processes can perform the required processing on the first and second entries e1, e2 in said data structure. When said first and second processes have performed the processing on said first and second entries e1, e2, said first and second processes are required to release said first and second locks lock(i), lock(i) of said first and second entry e1, e2. Said lock releasing means 70 enables said first and second process to release said first and second lock lock(i); lock(j) on said first and second entry e1, e2.

Said first and second entry are now free to be exclusively accessed by other processes.

According to a second embodiment of the present invention non-recursive locks are being used, which can not be locked multiple times by the same process. Said second lock acquiring means 50 is furthermore connected to said comparing means 20. Said lock releasing means 70 is furthermore connected to said comparing means 20; and said hashing means 10 receives a value representing said first entry e1 and a value representing the second entry e2 as input signals. Said hashing means 10 performs the hashing function on said received values representing said first and second entry e1, e2 into a first and a second hashed value i, j, between 1 and M. Said hashed values are used to index a table of M locks. Said comparing means 20 receives said first and second hashed values i, j, compares the values thereof, and outputs a comparison result. Said swapping means 30 receives the comparison result from said comparing means 20 as well as said first and second hashed values i, j and swaps said first and second hashed values i, j, if said second value j is smaller than said first value i according to the comparison result from said comparing means 20. The swapping of said first and second hashed values is performed when said second value j is smaller than said first value i, in order to avoid deadlock when said first hashed value equals said second hashed value. Then, said swapping means 30 outputs said first hashed value i to said first lock acquiring means 40 and said second hashed value j to said second lock acquiring means 50.

Said first lock acquiring means 40 enables a first process to acquire first lock lock(i) for said first entry e1 corresponding to said first hashed value i. Said second lock acquiring means 50 enables a second process to acquire a second lock lock(j) for said second entry e2 corresponding to the second hashed value j, when said second hashed value j does not equal said first hashed value i. Said accessing permission means 60 grants an exclusive access for said first process to said first entry e1 on the basis of the acquired first lock lock(i) and an exclusive access for said second process to said second entry e2 on the basis of the acquired second lock lock(j).

When said first and second process have acquired said first and second lock(i), lock(j), said first and second processes can perform the required processing on the first and second entries e1, e2 in said data structure. When said first and second processes have performed their processing on said first and second entry, said first and second process are required to release said first and second locks of said first and second entry e1, e2. Said lock releasing means 70 enables said first process to release said first lock lock(i) on said first entry e1, and said second process to release said second lock lock(j) on said second entry e2, if said second hashed value j does not equal said first hashed value I as determined by the comparing means 20.

Said first and the second entry e1, e2 are now free to be exclusively accessed by other processes.

Preferably, the value of M is proportional to the multiplication of the number of processes which are simultaneously accessing the data structure with the number of entries that said processes averagely need to lock in order to carry out their processing.

By applying the principles of the present invention it becomes possible to save memory for the locks but the parallelism may be reduced, since accesses to different entries that hashed to the same value are serialised. However, by using a good hashing function and choosing M large enough the reduction parallelism will be very small.

Said device for locking entries is preferably used in a computer system which is capable of concurrent processing and of handling multiple processes.

As apparent for a person skilled in the art although only a device for two entries is described above, device with more than two entries can also be arranged according to the principles of the present invention.

What is claimed is:

1. Method for locking entries, in particular in a large data structure, accessible from multiple processes, wherein recursive locks are being used, comprising the steps of:

hashing a first entry to a first value between 1 and M,
hashing a second entry to a second value between 1 and M;
swapping said first and second hashed values if said second value is smaller than said first value;
acquiring a first lock corresponding hashed first value by a first process; and
acquiring a second lock corresponding hashed second value by a second process;
wherein said first process is granted an exclusive access of said first entry on the basis of the hashed first values;
wherein said second process is granted an exclusive accesses of said second entry on the basis of the hashed second values;
wherein said first process is enabled to release said first lock after having executed the processing on said first entry and
wherein said second process is enabled to release said second lock after having executed the processing on said second entry.

2. Method according to claim 1, wherein:
the value M is proportional to the multiplication of the number of processes which are simultaneously accessing the data structure with the number of entries that said processes need on average to lock in order to carry out their processing.

3. Computer program product comprising computer program code means for causing a computer to perform the steps of the method as claimed in claim 1.

4. Method for locking entries, in particular in a large data structure, accessible from multiple processes, wherein non-recursive locks are being, used, comprising the steps of:

hashing a first entry to a first value between 1 and M,
hashing a second entry to a second value between 1 and M;
swapping said first and second hashed values if said second value is smaller than said first value;
acquiring a first lock corresponding the hashed first value by a first process; and
acquiring a second lock corresponding the hashed second value by a second process, if said first hashed value does not equal said second hashed value;
wherein said first process is granted an exclusive access of said first entry on the basis of the hashed first value;
wherein said second process is granted an exclusive access of said second entry on the basis of the hashed second value;
wherein said first process is enabled to release said first lock after having executed the processing on said first entry, and
wherein said second process is enabled to release said second lock after having executed the processing on said second entry, if said first hashed value does not equal said second value.

5. Device for locking entries, in particular in a large data structure, accessible from multiple processes, wherein recursive locks are being used, comprising:

hashing means for hashing a first entry to a first value between 1 and M, and a second entry to a second value between 1 and M;
comparing means for comparing said first and second hashed values;
swapping means for swapping said first and second hashed values if said comparing means has determined that said second value is smaller than said first value;
first lock acquiring means for enabling a first process to acquire a first lock corresponding to the hashed first value by;
second lock acquiring means for enabling a second process to acquire a second lock corresponding to the hashed second value;
accessing permission means for granting exclusive access of said first process to said first entry on the basis of the hashed first value and for granting exclusive access of said second process to said second entry on the basis of the hashed second value; and
lock releasing means for enabling said first process to release said first lock after having executed the processing on said first entry, and for enabling said second process to release said second lock after having executed the processing on said second entry.

6. Computer system for concurrent processing with a data structure comprising N entries, comprising:
a device for locking entries, in particular in a large data structure, accessible from multiple processes, using recursive locks according to claim 5.

7. Device for locking entries, in particular in a large data structure, accessible from multiple processes, wherein non-recursive locks are being, used, comprising:

hashing means for hashing a first entry to a first value between 1 and M, and a second entry to a second value between 1 and M;
comparing means for comparing said first and second hashed values;
swapping means for swapping said first and second hashed values if said comparing means has determined that said second value is smaller than said first value;

first lock acquiring means for enabling a first process to acquire a first lock corresponding to the hashed first value by;

second lock acquiring means for enabling a second process to acquire a second lock corresponding to the hashed second value, if said comparing means has determined, that said first hashed value does not equal said second hashed value;

accessing permission means for granting exclusive access of said first process to said first entry on the basis of the hashed first values and for granting exclusive access of said second process to said second entry on the basis of the hashed second values;

lock releasing means for enabling said first process to release said first lock after having executed the processing on said first entry, and for enabling said second process to release said second lock after having executed the processing on said second entry, if said comparing means has determined, that said first hashed value does not equal said second value.

* * * * *